United States Patent [19]
Namiki et al.

[11] Patent Number: 5,365,473
[45] Date of Patent: Nov. 15, 1994

[54] INTEGRAL VALUE CALCULATING DEVICE AND FUNCTION GRADIENT CALCULATING DEVICE

[75] Inventors: Takefumi Namiki; Masuhiro Mikami, both of Kawasaki, Japan

[73] Assignee: Fujitsu Limited, Kawasaki, Japan

[21] Appl. No.: 982,563

[22] Filed: Nov. 27, 1992

[30] Foreign Application Priority Data

Nov. 26, 1991 [JP] Japan .................... 3-310604

[51] Int. Cl.$^5$ .................. G06G 7/18; G06F 15/66; G06F 3/14
[52] U.S. Cl. ................ 364/829; 364/710.14; 395/140
[58] Field of Search ........... 364/829, 710.14, 710.01; 395/140

[56] References Cited

U.S. PATENT DOCUMENTS

| | | | |
|---|---|---|---|
| 4,535,416 | 8/1985 | Kano et al. | 364/710.01 |
| 4,794,553 | 12/1988 | Watanabe et al. | 364/710.01 |
| 4,794,554 | 12/1988 | Tamiya | 364/710.01 |
| 4,908,786 | 3/1990 | Kuno et al. | 364/710.11 |
| 5,067,102 | 11/1991 | Eisenstein | 364/709.12 |
| 5,210,708 | 5/1993 | Negishi | 364/710.14 |

*Primary Examiner*—Tan V. Mai
*Attorney, Agent, or Firm*—Staas & Halsey

[57] ABSTRACT

An integral value calculating device is used for calculating an integral value of a function, and a function gradient calculating device is used for calculating the gradient of the graph for a function. The object is to obtain a transport coefficient, etc. by designating an appropriate calculation range in analyzing the data output by a molecular dynamics simulator. In the integral value calculating device, a graph display unit outputs a graph according to received data, for example, a graph of a time correlation function F(t) of the time differential W'(t) to the dynamics volume W(T), in the format applicable to an external unit, for example, a display unit. A calculation range input unit designates an integral range for the function according to the position data externally input for the graph. An integral value calculating unit calculates an integral value for a function F(t), for example, for the designated integral range. In the function gradient calculating device, two points on a graph in which the gradient should be calculated are designated according to the position data input for a graph displayed on the display unit, for example. Then, a function gradient calculating unit calculates the gradient of the graph, for example, the graph for the mean square displacement G(t) of the dynamics volume W(t), between the two designated points.

10 Claims, 11 Drawing Sheets

FIG. 9A

| FILE SELECT | ANALYSIS |
|---|---|
| FILE NAME: Li<br>DATE: 1991 09 06<br>COMMENT: 300K 1atm | TRANSPORT COEFFICIENT CORRELATION FUNCTION |
| | TRANSPORT COEFFICIENT MEAN SQUARE DISPLACEMENT |

| | NO. | FILE NAME | LIST | DATE |
|---|---|---|---|---|
| ⇧ | 1. | Li | 300K 1atm | 1991 09 06 |
| | 2. | Be | 273K 2atm | 1991 08 19 |
| ⇩ | 3. | F | 298K 1atm | 1991 05 10 |

FIG. 9B

TRANSPORT COEFFICIENT (MEAN SQUARE DISPLACEMENT)

CALCULATE  [EXEC] [DONE]

TRANSPORT COEFFICIENT TYPE
  ☐ DIFFUSION FUNCTION
  ☐ SHEAR VISCOSITY
  ☐ BULK VISCOSITY

CALCULATE CONDITION

JOB COMMENT            [ Li 300K 1atm ]
START STEP             [ 130 ] STEP
CALCULATE INTERVAL     [ 50 ] STEP
NUMBER OF TIME SERIES  [ 80 ]
TIME SERIES SHIFT STEP [ 24 ] STEP
TIME SERIES LENGTH     [ 400 ] STEP

INTEGRAL VALUE CALCULATING DEVICE AND FUNCTION GRADIENT CALCULATING DEVICE

BACKGROUND OF THE INVENTION

1. Field of the Invention

The present invention relates to an integral value calculating device and a function gradient calculating device for easily calculating a transport coefficient, etc. by indicating the graph for the data outputted by a molecular dynamics simulator prior to an analysis of the data so that the scope of a calculation can be easily specified.

Molecular dynamics simulators have been developed as application technologies of super-computers, etc. capable of performing arithmetic operations for various advanced scientific technologies. These simulators figure out the properties, etc. of substances by simulating the behaviors of a molecule according to a molecular dynamics method after receiving the initial coordinates and an initial speed of an atom, an inter-atom potential function, the mass of an atom, the electric charge of an atom, etc.

Before describing the prior art of a molecular dynamics simulator pertaining to the analysis of output data, the summary of a molecular dynamics method is briefly explained as follows.

A molecular dynamics method is a computer simulation technology for analyzing the properties of multi-particle substances consisting of a number of particles by moving the particles according to the kinetic rules of the classical dynamics. The method itself originated in the old days, and a number of new technologies for the method have been developed since 1980, thus extending the scope of objects to be obtained by these technologies. This greatly depends on the development of the method of simulating a case under condition of fixed temperature and pressure while in the old days various experiments were carried out under condition of fixed energies and volume.

In computational physics used in the development of new substances (materials), the non-empirical molecular orbital method is in the stage of practical use in developing a fine molecular material having a small number of electrons. In this field, calculating, composing, and property-measuring processes have been used in combination as a new style of developing molecules. However, the classical molecular dynamics method in which potential functions are used for interatomic force and intermolecular force acts as an important part in designing materials for an atomic and molecular multi-particles body consisting of hundreds, thousands, or possibly tens of thousands of atoms where it is hard to successfully apply electronics even with the capabilities of giga flops realized by the latest computers.

Before the development of computer simulations, statistical mechanics had been used in analyzing according to micro data such as the correlation among atoms, etc. the structures and properties of a number of atomic and molecular groups. However, if the correlation among atoms is complicated to some extent, then exact solutions of basic equations in statistical mechanics cannot be obtained. Meanwhile, molecular dynamics realizes a simulation technology in which a multi-particles system Newton equation is analytically solved and the information similar to that obtained by statistical mechanics can be provided.

FIG. 1 shows input and output information according to the molecular dynamics method. Potential functions indicating the correlation among atoms and molecules, and physical environmental conditions such as temperatures and pressure, etc. are applied as the input information. Under these conditions, multi-particles system Newton equations are solved, and the resultant coordinates of the positions of atoms at predetermined points are statistically processed to provide thermodynamics properties (internal energies, specific heat, elastic constants, etc.) as the output information. If the coordinates of the position of an atom and its speed at each point are statistically processed, then dynamic properties (diffusion coefficients, shear viscosity, electric conductivity, thermal conductivity, etc.) and spectroscopic properties can be provided as the output information.

In a simulation based on the above described molecular dynamics, a substance such as a liquid, for example, composed of the enormous number of molecules is processed by tracing the movement of some of the molecules through a computer simulation so as to obtain the macroscopic properties of the substance. Then, conducting a simulation under condition of fixed temperature and pressure, for example, enables the structural phase change, where the particle positions in a crystal and the form of the crystal are subject to changes, to be directly detected. Necessarily, the number of particles and the time length of analysis greatly depend on the computational capabilities of computer systems, and an important object of this simulation technology has been to efficiently obtaining the macroscopic properties of substances using the smallest possible number of particle systems.

Self-diffusion coefficient, shear viscosity, bulk viscosity, thermal conductivity, electric conductivity, etc. can be obtained as transport coefficients by analyzing the data outputted by a simulator based on the molecular dynamics method. At this time, an error may be bigger, or the calculation time may be prolonged depending on the range of applicable output data. Therefore, it is required that the calculation range should be appropriately informed.

Conventionally, there are two calculation methods, that is, a method using a time correlation function and a method using a mean square displacement, when a transport coefficient is calculated using data obtained by the molecular dynamics method.

As well-known as a linear application theory, there is the following correlation between the time differentiation $W'(t)$ of a certain dynamics volume $W(t)$ and the transport coefficient $K$ of the volume transported by $W(t)$.

$$K = \int_0^\infty <W'(t)W'(0)> dt$$

$W'(t)$ can be calculated by the molecular dynamics method, but time t is limited and the integral calculation is carried out for the limited range. Therefore, in the practical calculation, the transport coefficient $K$ is approximated in the following equation.

$$K \approx \int_0^{t_0} <W'(t)W'(0)> dt$$

The precision greatly depends on the integral range.

The integral range generates the following graph.

$$F(t) = <[W'(t)W'(0)]>$$

(where $< >$ indicates and hereinafter refers to an average sample)

The value is effective up to the time $t_0$ where the amplitude of the function F(t) has been converged sufficiently. This is the method of calculating a transport coefficient using a time correlation function.

The transport coefficient K can also be obtained as follows.

$$K = \lim_{t \to \infty} \tfrac{1}{2}t<[W(t) - W(0)]^2>$$

because the following equation can exist mathematically.

$$\int_0^\infty <W'(t)W'(0)>dt = \lim_{t \to \infty} \tfrac{1}{2}t<[W(t) - W(0)]^2>$$

In this case, the dynamics volume W(t) is calculated by the molecular dynamics method to draw a graph $G(t) = <[W(t)-W(0)]^2>$, and the value, of the gradient of the linear portion in the graph. This is the method of calculating a transport coefficient using a mean square displacement.

Conventionally, when the range of data used for obtaining such a transport coefficient is designated, a trial-and-error test is carried out based on empirical knowledge, or an appropriate range is determined by manually drawing an approximate graph.

Just for information, equations used in calculating a transport coefficient using data outputted by the calculation according to the molecular dynamics method are explained briefly as follows.

As described above, there is the following correlation among a certain dynamics volume W(t), its time differentiation W'(t), and the transport coefficient K of the volume transported by W(t).

$$\int_0^\infty <W'(t)W'(0)>dt = \lim_{t \to \infty} \tfrac{1}{2}t<[W(t) - W(0)]^2>$$

The correlation among various transport coefficients K, dynamics volume W(t), and the time differentiation W'(t) is represented as follows.

(1) Self-diffusion coefficient D:

K = D $$W(t) = vec - r_i(t) = (x_i(t), y_i(t), z_i(t))$$

$$W'(t) = vec - v_i(t) = (v_{ix}(t), v_{iy}(t), v_{iz}(t))$$

where $vec - r_i(t)$ indicates a position vector of a particle i at the time t, and $vec - v_i(t)$ indicates a speed vector of a particle i at the time t.

$v_{ix}(t)$, $v_{iy}(t)$, and $v_{iz}(t)$ indicate time differentiations of $x_i(t)$, $y_i(t)$, $z_i(t)$ respectively.

(2) Shear viscosity $\eta$:

$K = V k_B T \eta$ (where V indicates volume, T temperature, and $k_B$ Boltzmann's constant)

$$W(t) = m\Sigma\{v_{ix}(t)y_i(t) + v_{iy}(t)z_i(t) + v_{iz}(t)x_i(t) + v_{ix}(t)z_i(t) + v_{iy}(t)x_i(t) + v_{iz}(t)y_i(t)\}$$

$$W'(t) = 2m\Sigma\{v_{ix}(t)v_{iy}(t) + v_{iy}(t)v_{iz}(t) + v_{iz}(t)v_{ix}(t)\} + \Sigma\{F_{ix}(t)y_i(t) + F_{iy}(t)z_i(t) + F_{iz}(t)x_i(t) + F_{ix}(t)z_i(t) + F_{iy}(t)x_i(t) + F_{iz}(t)y_i(t)\}$$

where $\Sigma$ indicates a sum of $i=1$ through N when the number of particles is N.

m indicates the mass of a particle, $F_{ix}(t)$, $F_{iy}(t)$, and $F_{iz}(t)$ indicate respectively x, y, and z components of the force applied to the particle i.

(3) Bulk viscosity $\xi$:

$$W(t) = m\Sigma\{v_{ix}(t)x_i(t) + v_{iy}(t)y_i(t) + v_{iz}(t)z_i(t)\}$$

$$W'(t) = m\Sigma\{F_{ix}(t)x_i(t) + F_{iy}(t)y_i(t) + F_{iz}(t)z_i(t) + m\Sigma\{v_{ix}(t)^2 + v_{iy}(t)^2 + v_{iz}(t)^2\}$$

(where $\Sigma$ indicates the sum of $i=1$ through N (the number of particles))

(4) Thermal conductivity $\lambda$:

$K = V k_B T^2 \lambda$ $$W(t) = \Sigma\{x_i(t) + y_i(t) + z_i(t)\} \times \{(\tfrac{1}{2})m(vec - v_i(t))^2 + (\tfrac{1}{2})\phi_i(t)\}$$

$$W'(t) = \Sigma\{v_{ix}(t) + v_{iy}(t) + v_{iz}(t)\} \times \{(\tfrac{1}{2})m(vec - v_i(t))^2 + (\tfrac{1}{2})\phi_i(t)\} + (\tfrac{1}{2})\Sigma[v_{ix}(t)x_i(t)\{F_{ix}(t) + F_{iy}(t) + F_{iz}(t)\} + v_{iy}(t)y_i(t)\{F_{ix}(t) + F_{iy}(t) + F_{iz}(t)\} + v_{iz}(t)z_i(t)\{F_{ix}(t) + F_{iy}(t) + F_{iz}(t)\}]^2$$

where $\phi_i(t)$ indicates the potential energy of a particle i at the time t.

($\Sigma$ indicates the sum of $i=1$ through N (the number of particles))

(5) Electric conductivity $\sigma$:

$K = V k_B T \sigma$ $W(t) = \Sigma Q_i vec - r_i(t)$ $W'(t) = \Sigma Q_i vec - v_i(t)$ where $Q_i$ indicates the electric charge of the particle i.

($\Sigma$ indicates the sum of $i=1$ through N (the number of particles))

According to the molecular dynamics method, the coordinates, speed, potential energy, etc. of each particle at each point are calculated, the results of which are used in calculating W(t) and W'(t) by the above mentioned equations.

As described above, the integral range should be determined when a transport coefficient is calculated using a time correlation function. However, it is not efficient to calculate a transport coefficient by drawing the graph $F(t) = <[W'(t)W'(t)]>$ on paper, etc., reading the time $t_0$ where the amplitude of the function F(t) has been sufficiently converged, and applying the integral result to an executable program $t_0$.

When a transport coefficient is calculated using a mean square displacement, the graph for Function $G(t) = <[W(t)-W(0)]^2>$ should be draught, the range of the linear portion be extracted, and then the gradient of the linear portion be read. Furthermore, the performance becomes more inefficient if the method of least square is adopted in calculating the gradient of the linear portion.

If unknown data in time series obtained by a computer system are analyzed, not limited to the case where a transport coefficient is calculated, then the range of the calculation must be determined depending on the types of the data so as to obtain a necessary result. Conventionally, there are no guidelines for selecting the range of the calculation. Accordingly, it should be selected by the empirical knowledge from a list of numerical character strings, or by manually drawing a graph. This often causes errors and requires considerable labor and time.

SUMMARY OF THE INVENTION

The present invention has been developed to solve the above described problems of the prior art, and aims at providing an integral value calculating device and a function gradient calculating device capable of easily designating the appropriate range of a calculation so that a transport coefficient, etc. can be easily calculated.

A feature of the present invention resides in an integral value calculating device for calculating the integral value of a function, comprising graph display unit for outputting the graph for a function according to received data in the format applicable to an external unit of the integral value calculating unit, calculation range input unit for designating the integral range for the function according to the position data externally designated for the graph, and integral value calculating unit for calculating the integral value of the function for the designated integral range.

BRIEF DESCRIPTION OF THE DRAWINGS

FIG. 9A shows a first example of a condition input screen; and

FIG. 9B shows a second example of a condition input screen;

DESCRIPTION OF THE PREFERRED EMBODIMENTS

Figure 1:
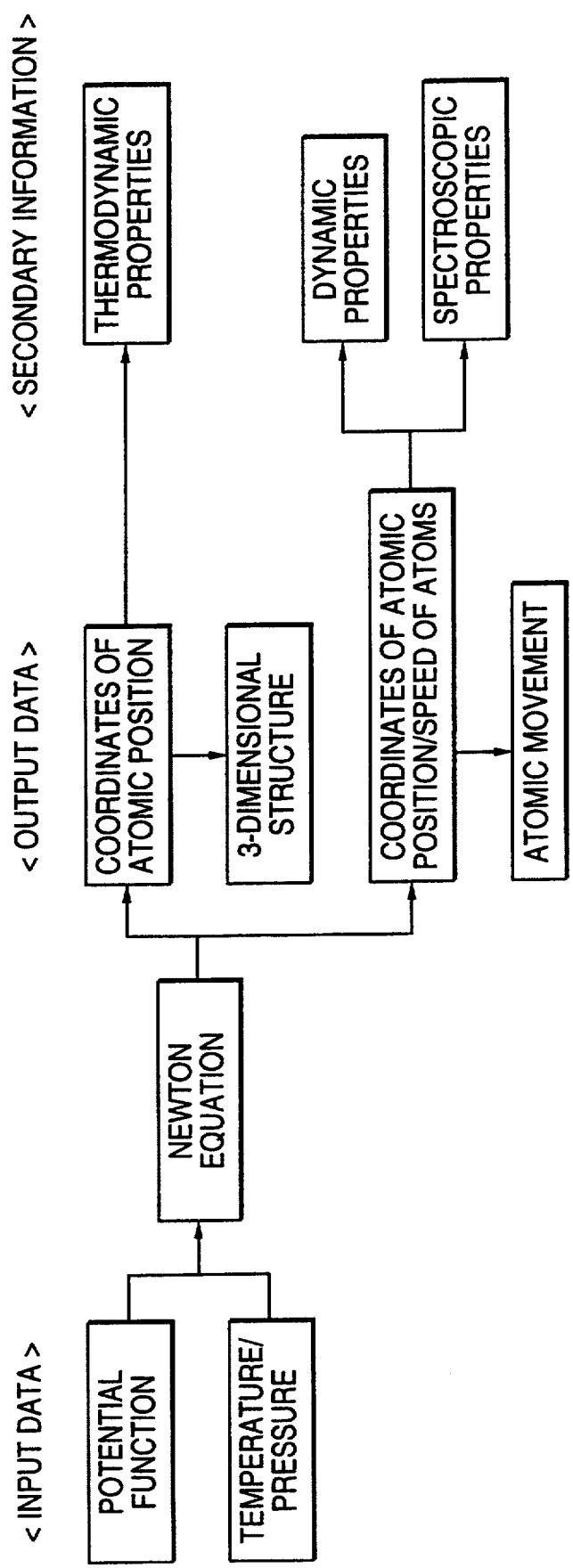
FIG. 1 shows input and output information according to the molecular dynamics method.
Figure 2B:
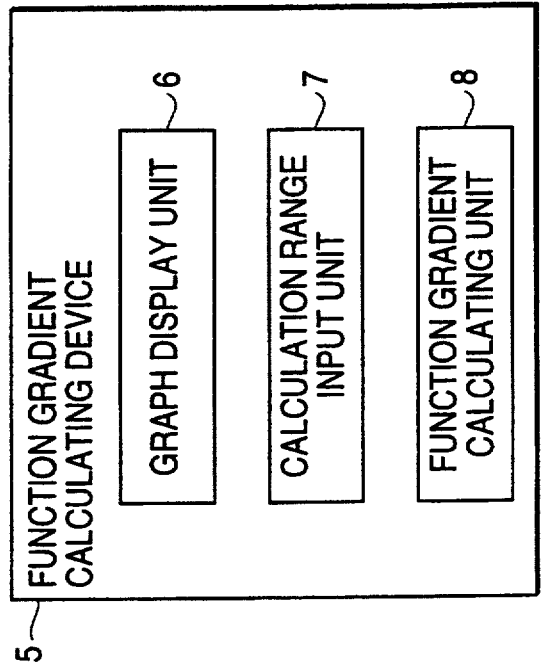
FIG. 2B is a block diagram showing the configuration of the second principle of the present invention.
Figure 2A:
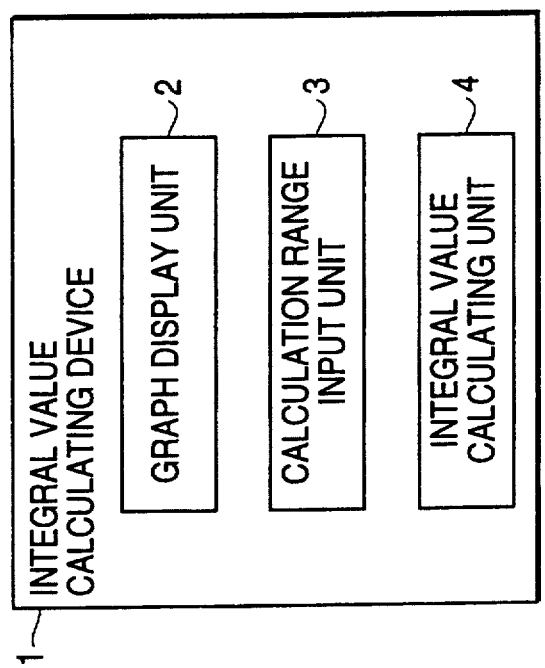
FIG. 2A is a block diagram showing the configuration of the first principle of the present invention.

FIGS. 2A and 2B are block diagrams showing the configuration of the principle of the present invention. FIG. 2A is the block diagram showing the configuration of the principle of the integral value calculating device according to the first principle of the present invention. In FIG. 2A, an integral value calculating device 1 comprises a graph display unit 2, a calculation range input unit 3, and an integral value calculating unit 4.

The graph display unit 2 displays the graph for the function to be processed by an integral value calculation on the screen of a display unit according to the data stored in the function data storage unit, for example. The calculation range input unit 3 designates the integral range of a function to be processed by an integral calculation in response to the user's designation of two points in the graph on the screen of the display unit through a mouse. The integral value calculating unit 4 calculates the integral value of a function to be processed by an integral value calculation performed for the integral range designated by the calculation range input unit 3, and displays the result on the screen of a display unit, for example.

The integral value calculating device according to the first principle of the present invention is also used in calculating a transport coefficient using the output data calculated by the molecular dynamics method. In this case, for example, the graph display unit 2 displays on the screen of a display unit the graph for F(t) according to the data outputted by a simulator based on the molecular dynamics method, where W'(t) indicates the time differentiation of the dynamics volume W(t), and F(t) indicates its time correlation function. If the calculation range input unit 3 designates two time values $t_1$ and $t_2$ as an integral range to calculate a transport coefficient in response to the user's designation through a mouse, then the transport coefficient calculating unit, for example, corresponding to the integral value calculating unit 4 calculates an integral value of a function F(t) for the designated integral range, and it displays the result as a transport coefficient on the screen of a display unit, for example.

FIG. 2B is the block diagram showing the principle of the function gradient calculating device according to the second principle of the present invention. In FIG. 2B, a function gradient calculation device 5 comprises a graph display unit 6, a calculation range input unit 7, and a function gradient calculating unit 8.

The graph display unit 6 displays the graph for the function to be processed in a gradient calculation on the screen of a display unit, for example. The calculation range input unit 7 designates two points for determining the gradient in response to the user's designation in the graph through a mouse, etc. on the screen of a display unit, for example. The function gradient calculating unit 8 calculates the gradient of the graph for the function containing the designated two points, and displays the calculation result on the screen of a display unit.

The function gradient calculating device according to the second principle of the present invention is also used in calculating a transport coefficient using a mean square displacement obtained from the data outputted by the molecular dynamics method. At this time, the graph display unit 6 displays the mean square displacement G(t) of the dynamics volume W(t) on the screen according to the data outputted by a molecular dynamics simulator. The calculation range input unit 7 designates the calculation range to obtain a transport coefficient according to the positions in a graph of the two points designated through a mouse, for example. The transport coefficient calculating unit, for example, corresponding to the function gradient calculating unit 8 calculates the gradient of the graph for G(t) containing the designated two points, and displays the result as a transport coefficient of the dynamics volume W(t) on the screen of a display unit.

Thus, according to the present invention, the graph for the data to be analyzed is displayed on a display unit. Based on the displayed graph, a user easily designates through a pen hit or a mouse an appropriate range for a calculation. Therefore, data can be analyzed within a short time with excellent precision.

Especially, when a transport coefficient is calculated by using a time correlation function, the time $t_0$ where the amplitude has been sufficiently converged can be easily designated as an integral range according to the graph for the function F(t). Therefore, a precise result can be obtained. When a transport coefficient is calculated by using a mean square displacement, the calculation range of the linear portion can be designated according to the graph for the function G(t). Therefore, a precise transport coefficient can be easily calculated. A desirable result can be obtained by automatically calculating the gradient by the method of least square, for example.

Figure 3:
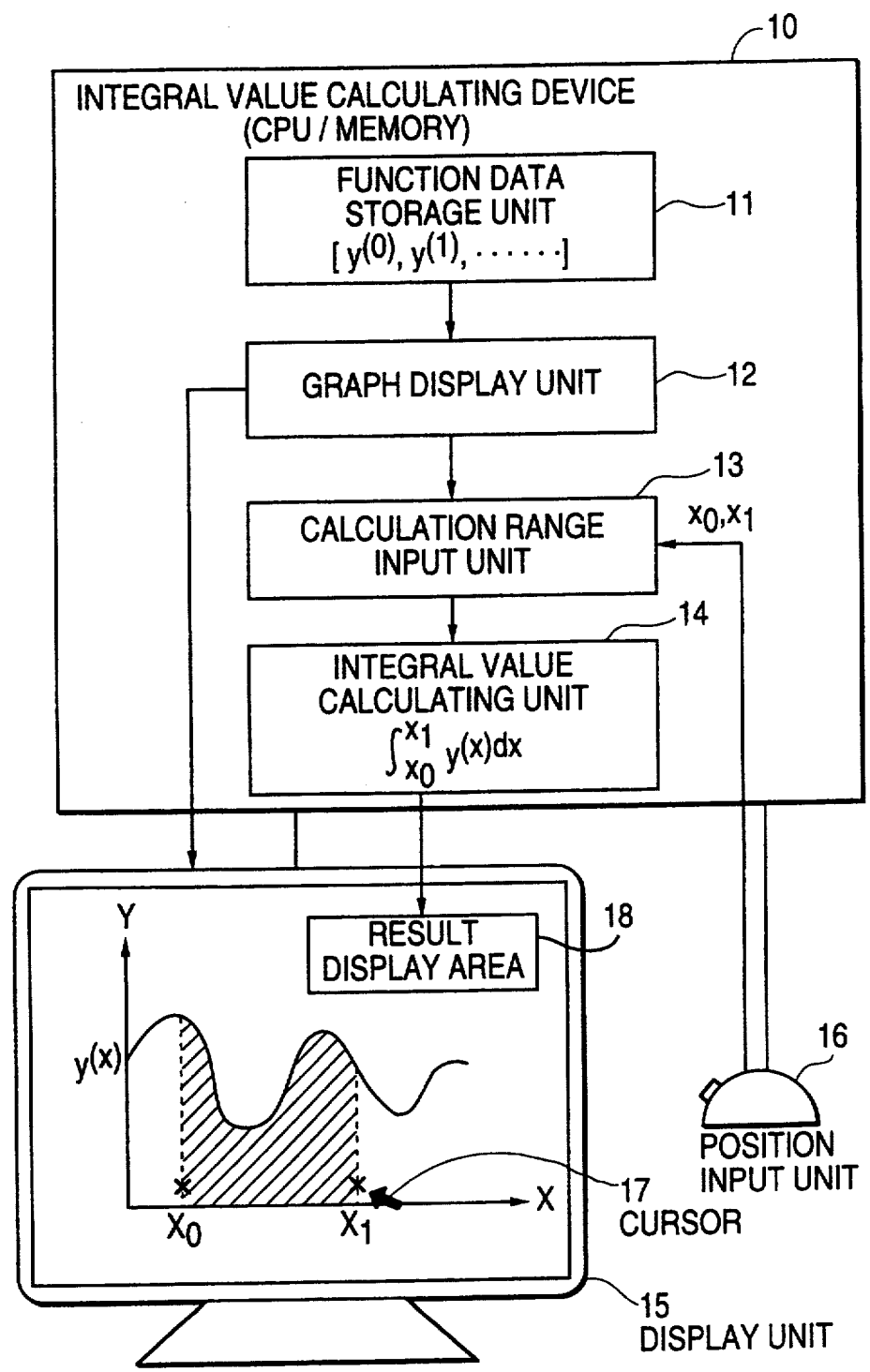
FIG. 3 is a block diagram showing the configuration of the embodiment of the first principle of the present invention.

FIG. 3 is the block diagram showing the configuration of the embodiment of the integral value calculating device according to the first principle of the present invention. In FIG. 3, an integral value calculating device 10 comprises a CPU, a memory, etc.; a function data storage unit 11 for storing data to be processed by a computer; a graph display unit 12 displays function data on a display unit in the representation of a graph; a calculation range input unit 13 inputs an integral range; an integral value calculating unit 14 calculates an integral value; 15 is a display unit; a position input unit 16 inputs the position on the screen using a mouse or a write pen, etc.; a cursor 17 indicates the present position of an operation; and a result display area 18 displays the result display area of a calculated integral value.

The graph display unit 12 displays the graph for the function determined according to the data stored in the function data storage unit 11 on the display unit 15.

The calculation range input unit 13 designates an integral range by inputting the position to the position inputting unit 16 the position in the graph displayed on the display unit 15.

The integral value calculating unit 14 calculates the integral value of the function indicated by the data stored in the function data storage unit 11 for the integral range designated by the calculation range input unit 13, and it displays the result in the result display area 18 on the display unit 15.

The steps of an integral calculation performed by the integral value calculating device are described below. In the first step, a data string of a function to be processed in an integral calculation is selected. The function data string can be commonly represented as $\{y(t_0), y(t_1), \ldots y(t_n)\}$.

In the second step, according to the selected function string the graph for the function is displayed on the screen of a display unit.

In the third step, an integral method, that is, a trapezoidal rule, a Simpson method, etc. is selected.

In the fourth step, a user inputs a start point and an end point of an integral calculation to a position input unit, for example, a mouse, by referring to the screen of a display unit.

In the fifth step, the calculation for an integral value is actually carried out. For example, when the trapezoidal rule is used, the sample time $t_1$ larger, but the smallest possible value, than the start point of the integral calculation inputted in the fourth step is determined from the selected function string, and the sample time $t_m$ smaller, but the largest possible value, than the end point of the integral calculation is determined from the selected function string. Then, the integral value is calculated by the following equation according to the trapezoidal rule.

$$S = \tfrac{1}{2}\{y(t_1 + 1) + y(t_l)\} \times (t_{l+1} - t_l) + \tfrac{1}{2}\{y(t_{l+2}) + y(t_{l+1})\} \times (t_{l+2} - t_{l+1}) + \ldots + \tfrac{1}{2}\{y(t_m) + y(t_{m-1})\} \times (t_m - t_{m-1})$$

Thus, the integral value S calculated in the sixth step is displayed, and the process is terminated.

Figure 4:
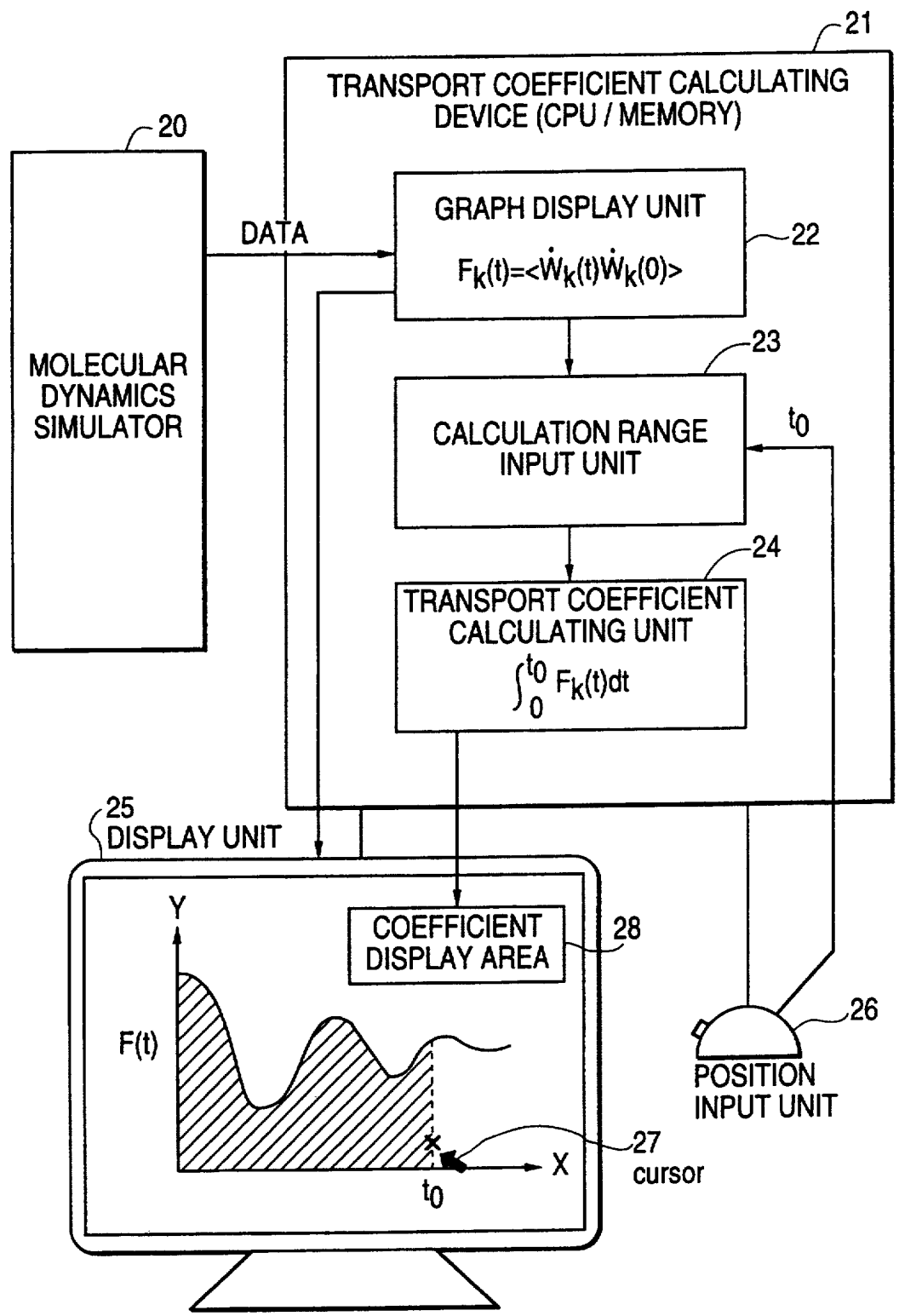
FIG. 4 is the block diagram showing the configuration of the embodiment (1) of the transport coefficient calculating device as an application sample of the first principle of the present invention.

FIG. 4 is the block diagram showing the configuration of the embodiment (1) of the transport coefficient calculating device as an application sample of the first principle of the present invention.

In FIG. 4, a molecular dynamics simulator 20 simulates the behavior of a molecule according to the molecular dynamics; a transport coefficient calculating device 21 comprises a CPU, a memory, etc.; a graph display unit 22 displays a graph for obtaining a transport coefficient; a calculation range input unit 23 inputs an integral range value; a transport coefficient calculating unit 24 calculates a transport coefficient by calculating an integral value; 25 is a display unit; a position input unit 26 such as a mouse, a write pen, etc. inputs a position on the screen; a cursor 27 displays the present position of an operation on the screen; and a coefficient display area 28 displays the calculation result of the transport coefficient.

The molecular dynamics simulator 20 simulates the behavior of a molecule according to the molecular dynamics in response to the input of the initial coordinates and an initial speed of an atom, an inter-atom potential function, the mass of an atom, the electric charge of an atom, etc. It outputs the coordinates, speed, and potential energies, etc. at each time point for each atom. The configuration itself of the molecular dynamics simulator 20 is not important in the summary of the present invention, and the explanation is omitted here.

The graph display unit 22 displays on the X-Y plane on the screen of the display unit 25 according to the data outputted by the molecular dynamics simulator 20 the graph $Y=F(t)$, $X=t$, where $W'(t)$ indicates the time differentiation of the dynamics volume $W(t)$, that is, a time function; and $F(t)$ indicates the time correlation function $<[W'(t)W'(0)]>$.

The calculation range input unit 23 designates an integral range to obtain a transport coefficient by inputting to the position input unit 26 the position in the graph displayed on the display unit 25.

The transport coefficient calculating unit 24 calculates the integral value of $F(t)$ for the integral range designated by the calculation range input unit 23, and displays the result as a transport coefficient on the coefficient display area.

Figure 5:
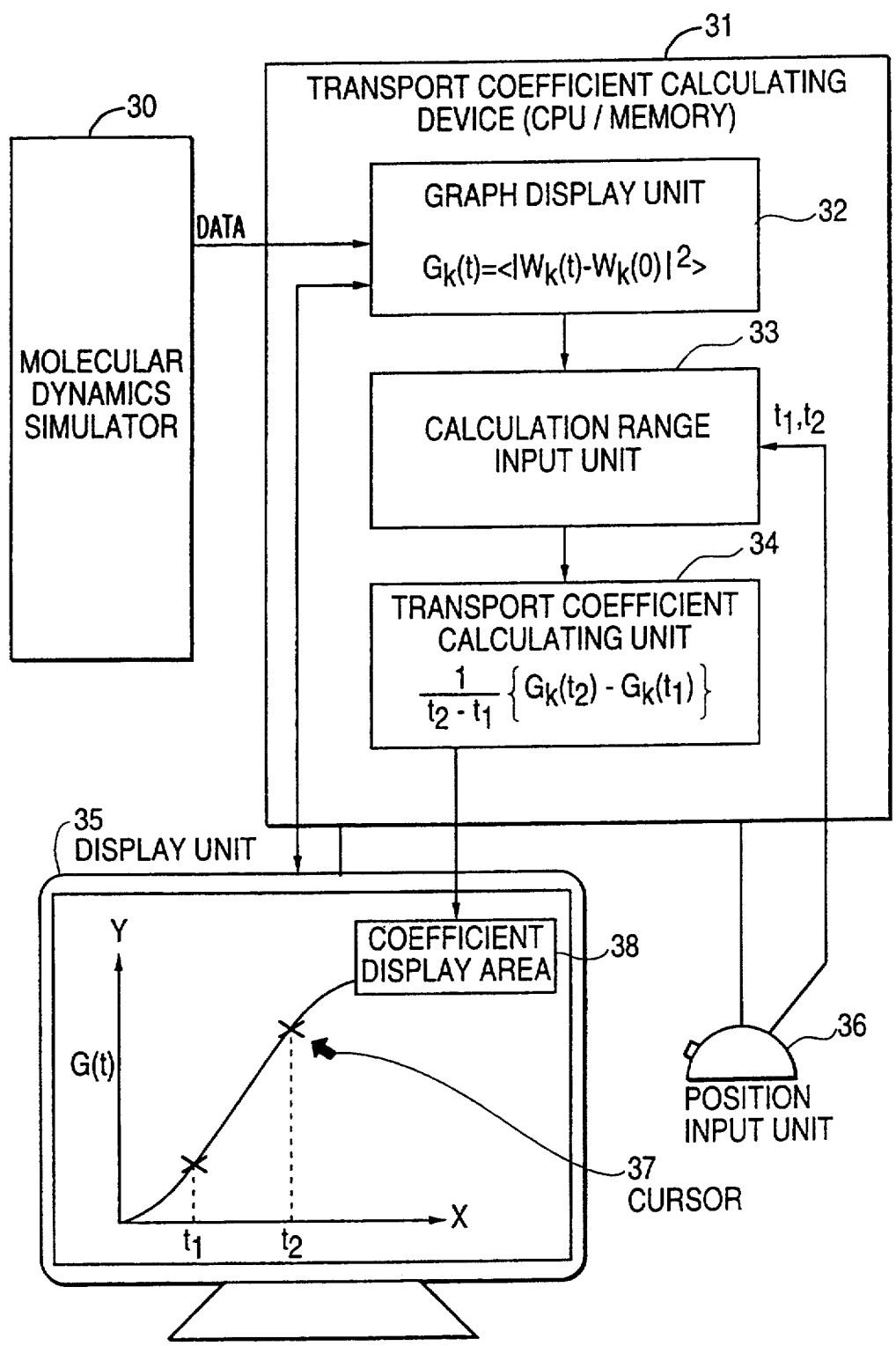
FIG. 5 is the block diagram showing the configuration of the embodiment (2) of the transport coefficient calculating device as an application of the function gradient calculating device according to the second principle of the present invention.

FIG. 5 is the block diagram showing the configuration of the embodiment (2) of the transport coefficient calculating device as an application of the function gradient calculating device according to the second principle of the present invention.

In FIG. 5, a molecular dynamics simulator 30 simulates the behavior of a molecule according to the molecular dynamics; a transport coefficient calculating device 31 comprises a CPU, a memory, etc.; a graph display unit 32 displays a graph for obtaining a transport coefficient; a calculation range input unit 33 inputs an integral range value; a transport coefficient calculating unit 34 calculates a transport coefficient by calculating an integral value; 35 is a display unit; a position input unit 36 such as a mouse, a write pen, etc. inputs a position on the screen; a cursor 37 displays the present position of an operation on the screen; and a coefficient display area 38 displays the calculation result of the transport coefficient.

Generally, in the analysis of experimental data, etc., it may be necessary to calculate the gradient of the portion where obtained data indicate a linear change. In the second principle of the present invention, the gradient of the function data is automatically calculated by the method of least square by displaying the graph on a display unit and inputting two points on the graph to the position input unit, and the result is displayed on the display unit.

The unit shown in FIG. 4 calculates a transport coefficient using a time correlation function, while the unit shown in FIG. 5 calculates it by a mean square displacement.

The graph display unit 32 displays on the X-Y plane on the screen of the display unit 15 according to the data outputted by the molecular dynamics simulator 30 the graph $Y=G(t)$, $X=t$, where $W(t)$ indicates the dynamics volume $W(t)$, that is, a time function; and $G(t)$ indicates a mean square displacement $<[W(t)-W(0)]^2>$.

The calculation range input unit 33 designates an integral range to obtain a transport coefficient by inputting to the position input unit 36 the position in the graph displayed on the display unit 35.

The transport coefficient calculating unit 34 calculates the gradient $\{G(t_2)-G(t_1)\}/(t_2-t_1)$ of the graph for the function $G(t)$ containing the two points designated by the calculation range input unit 33, and displays the result as the transport coefficient of the dynamics volume $W(t)$ on the coefficient display area 38. The gradient of the graph is calculated by the method of least square, for example.

Figure 6:
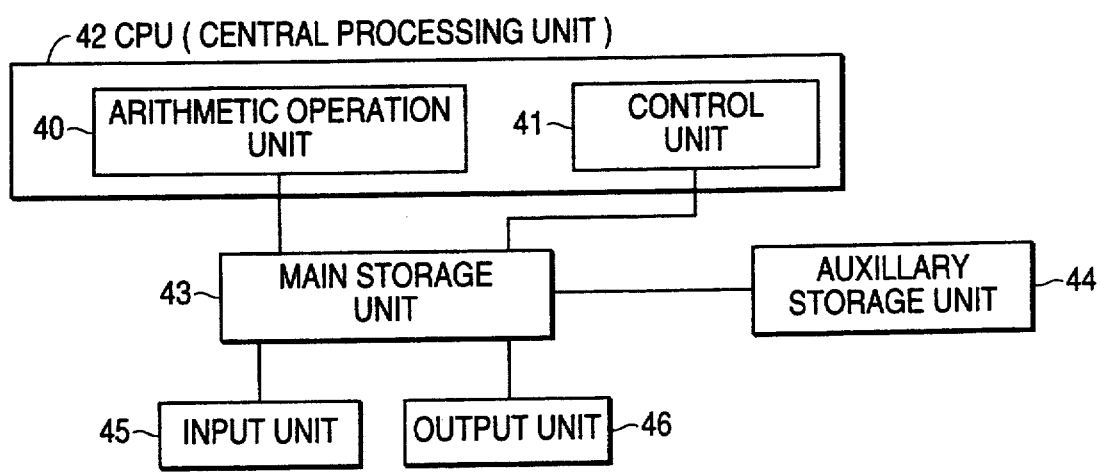
FIG. 6 is the block diagram showing the configuration of the computer system for realizing the present invention.

FIG. 6 is the block diagram showing the entire configuration of the computer system for realizing the integral value calculating device according to the first principle, or the function gradient calculating device according to the second principle of the present invention. As shown in FIG. 6, the system comprises a central processing unit (CPU) 42 having an arithmetic operation unit 40 and a control unit 41, a main storage unit 43, an auxiliary storage unit 44 such as disks, an input unit 45 such as a mouse and a keyboard, and an output unit 46 such as a display unit. Although the configuration is common, it is explained below relative to the configuration of the integral value calculating device and the transport coefficient calculating device shown in FIGS. 3 through 5.

In FIGS. 3 through 5, the function data storage unit 11 corresponds mainly to the main storage unit 43 shown in FIG. 6, and a part of the function data are stored in the auxiliary storage unit 44. Various processing unit, that is, the graph display units 12, 22, and 32, the calculation range input units 13, 23, and 33, the integral value calculating unit 14, and the transport coefficient calculating units 24 and 34 are configured in the central processing unit 42. The necessary data or programs for the processes are read and used from the main storage unit 43 or the auxiliary storage unit 44.

Figure 7A:
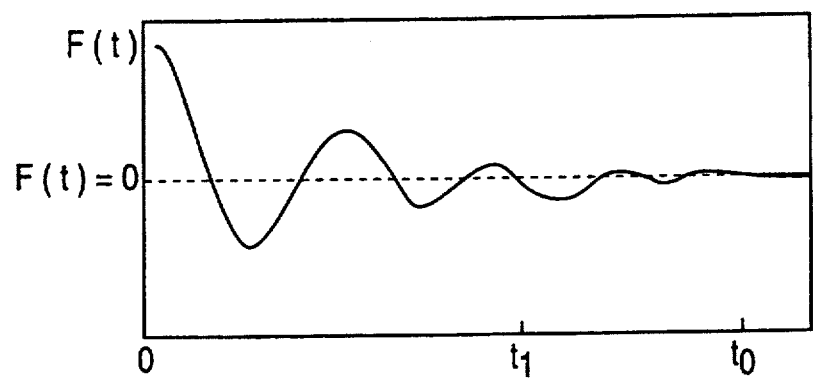
FIG. 7A illustrates a first graph of the time correlation function to show how to designate the calculation range for an embodiment of the present invention.
Figure 7B:
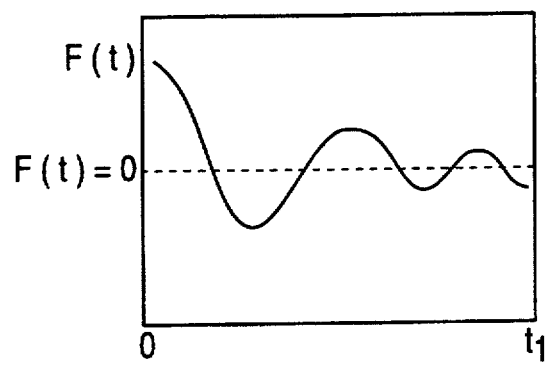
FIG. 7B illustrates a second graph of the time correlation function to show how to designate the calculation range for an embodiment of the present invention.
Figure 7C:
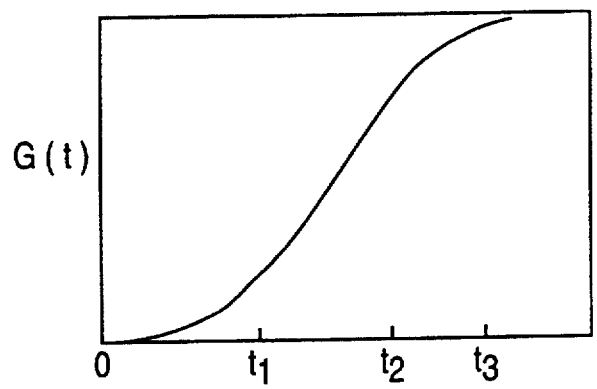
FIG. 7C illustrates a graph of the mean square displacement to show how to designate the calculation range for an embodiment of the present invention.

FIGS. 7A, 7B and 7C show how to designate the calculation range for an embodiment of the present invention.

When a transport coefficient is calculated using a time correlation function according to the data outputted by the molecular dynamics simulator, a numerical integration is required.

The transport function K can be obtained by performing the integration $<[W'(t)W'(0)]>$ where the time value varies from 0 to infinity. However, in the numerical integration, the integration cannot be performed to the infinity. Therefore, the result should be approximated by specifying the range as 0 through $t_0$.

The time correlation function $F(t)=<[W'(t)W'(0)]>$ is usually represented as shown in FIG. 7A. The integral range should be set to the point $t_0$ where the amplitude has sufficiently converged. Otherwise, a correct result cannot be obtained, and the result is insufficient between the range 0 through $t_1$, for example. A convergence point can be detected apparently in the graph. If the integral range is reserved as too long, calculation errors, etc. may be caused undesirably.

If the calculation data for the molecular dynamics method is insufficient for short of time, then the time correlation function $F(t)$ is represented as shown An FIG. 7B. Thus, when data are not sufficient for short of time, a transport coefficient K cannot be calculated. Therefore, a calculation is performed according to the molecular dynamics method again, and the resultant data should be added. Whether or not the calculated data are sufficient can be apparently determined at a graph. Thus, erroneous and redundant calculations can be omitted.

The transport coefficient K can also be obtained by the following equation. However, in an arithmetic $$K = \lim_{t \to \infty} \tfrac{1}{t} <[W(t) - W(0)]^2>$$

operation, a result cannot be obtained to the limiting value ($t \to \infty$). Therefore, using the limited value t, the following graph is drawn to obtain the transport coefficient K from the gradient.

$$G(t) = <[W(t) - W(0)]^2>$$

The mean square displacement $G(t) = <[W(t)-W(0)]^2>$ is usually represented by the graph shown in FIG. 7C.

In this graph, since the removal distance of a particle within the range $t=0-t_1$ is shorter than a mean free path, no transport phenomena are generated. By contrast, since the removal distance of a particle within the range $t=t_2-t_3$ is too long, the transport phenomena is hard to generate. Therefore, the gradient of the graph should be calculated in the range $t_1-t_2$. It is well-known that the method of least square results in excellent precision in calculating the gradient for the graph.

The above described fact can be clarified by displaying graphs.

Figure 8:
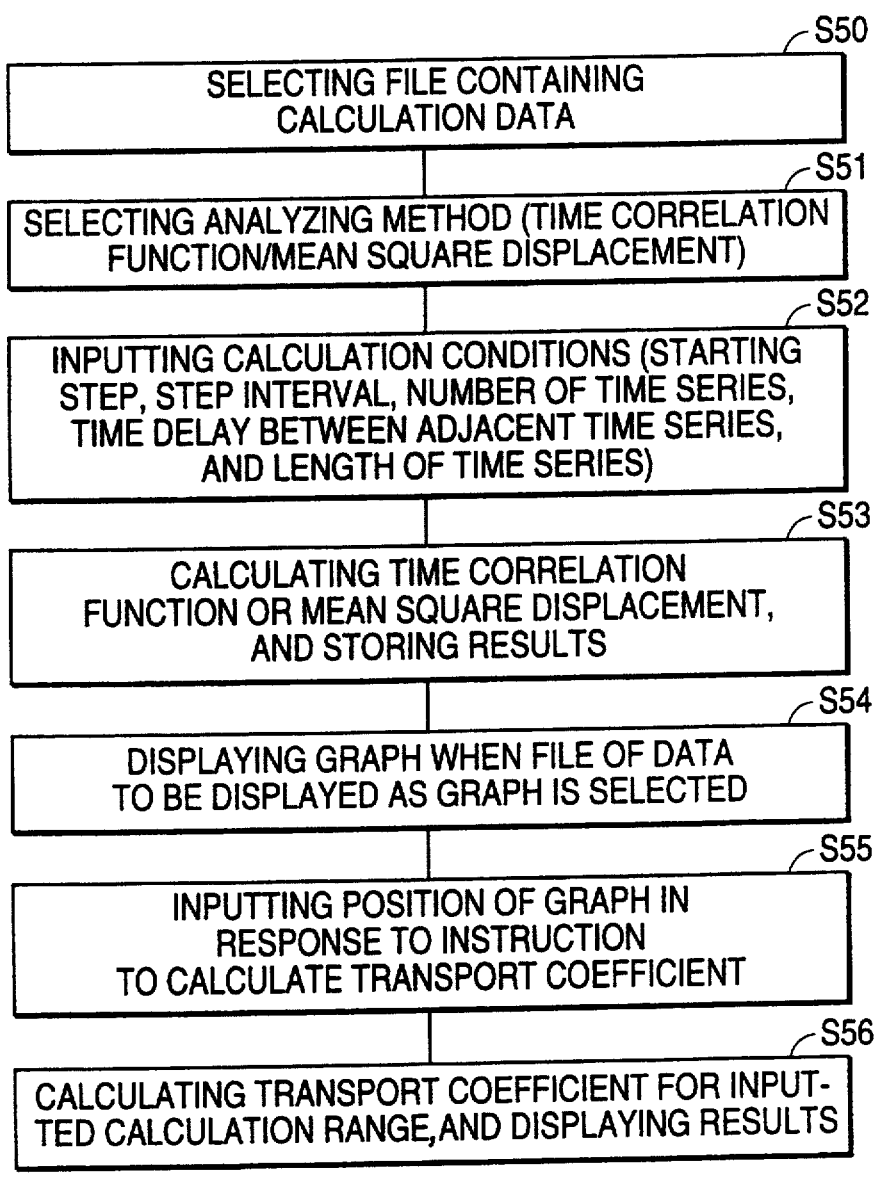
FIG. 8 is the flowchart for explaining the embodiment of the transport coefficient calculation.

FIG. 8 is a flowchart of an embodiment of the transport coefficient calculation according to the present invention; FIG. 9 shows an example of a conditional input screen in calculating a transport coefficient associated with the embodiment of the present invention; and FIG. 10 shows an example of a graph display screen associated with an embodiment of the present invention.

Embodiments of the present invention are explained for steps S50-S56 shown in FIG. 8 by referring to FIGS. 9A, 9B, 10A and 10B.

When the data outputted by the molecular dynamics simulator are analyzed, each of them is first instructed as to how the analysis is carried out. First, in S50, a file containing the data outputted by the simulator is selected by a mouse click from a file name list on the conditional input screen shown in FIG. 9A according to the "File select" function. The file-name list can be scrolled by clicking the leftmost up and down arrows. In this example, the file "Li" is assumed to be selected.

Next, in S51, a pull-down menu is opened by clicking an analysis button to designate an analyzing method. Here, selection menu includes "Transport coefficient (correlation function)". "Transport coefficient (Mean square displacement)", etc. If a transport coefficient is calculated using a time correlation function, then "Transport coefficient (correlation function)" is selected. If the calculation is carried out using a mean square displacement, then "Transport coefficient (Mean square displacement)" is selected.

Next, in S52, the type of transport coefficient and the condition on the calculation of the transport coefficient are inputted on the input screen shown in FIG. 9B. The types of transport coefficients are diffusion function, shear viscosity, bulk viscosity, thermal conductivity, electric conductivity, etc. The calculation conditions are listed as follows.

Job comment: optional comment assigned to the present calculation

Start step: designating a step number in an output file of a simulator where the calculation is to start.

calculate interval: designating the step interval for a sampling

Number of time series

Time series shift step: designating the time delay between adjacent time series

Time series length: designating the length of time series

Although omitted in figures, various data such as the number of entire steps, time per one step, temperature, pressure, starting time ending time, etc. are automatically displayed on the screen according to the file of selected output data and the calculation conditions.

The number of time series of time series data, starting step, step intervals, etc. are explained in detail. First, the time series data outputted by molecular dynamics simulators (N units each) have the following M variations.

$$\{f_1(t_1), f_1(t_2), \ldots, f_1(t_N)\}$$
$$\{f_2(t_1), f_2(t_2), \ldots, f_2(t_N)\}$$
$$\vdots$$
$$\{f_M(t_1), f_M(t_2), \ldots, f_M(t_N)\}$$

Assuming that a certain dynamics volume W(t) is calculated by the M types of time series data (there are a number calculating methods, and are not described here), the time series data of the dynamics volume W(t) are represented as follows.

$$\{W(t_1), W(t_2), \ldots, W(t_N)\}$$

L pieces of data 1 through L are retrieved each being shifted by Id steps from the time series data above.

1. $\{W(t_I), W(t_{I+J}), \ldots, W(t_{I+(K-1)J})\}$
2. $\{W(t_{I+Id}), W(t_{I+Id+J}), \ldots, W(t_{I+Id+(K-1)J})\}$ $\vdots$ L. $\{W(t_{I+(L-1)Id}), W(t_{I+(L-1)Id+J}), \ldots,$
   $W(t_{I+(L-1)Id+(K-1)J})\}$ where I indicates a starting step, J indicates a step interval, K indicates the length of time series, Id indicates the step corresponding to the time delay of each time series, and L indicates the number of time series. I through L are all natural numbers, and $I+(L-1)Id+(K-1)J$ is smaller than N.

These L pieces of time series data are time delayed by Id steps. In the stationary stochastic process, these L pieces of samples, for example, $W(t_I)$, $W(t_{I+Id})$, $\ldots$, $W(t_{I+(L-1)Id})$ are considered to be different samples of the dynamics volume W(t) at the same time. The value is considered to be large enough so as to make $W(t_I)$ and $W(t_{I+Id})$ statistically independent.

A sampling process is carried out by the above method when a transport coefficient is calculated by using a time correlation function or mean square displacement. The time differential W'(t) of the dynamics volume W(t) is not calculated after obtaining W(t), but it is directly calculated using the above mentioned M types of simulator outputs.

When the exec. button shown in FIG. 9B is clicked after the input of conditions is completed in S52 shown in FIG. 8, the calculation using a time correlation function or a mean square displacement is started, and the result is stored in a predetermined file.

Figure 10A:
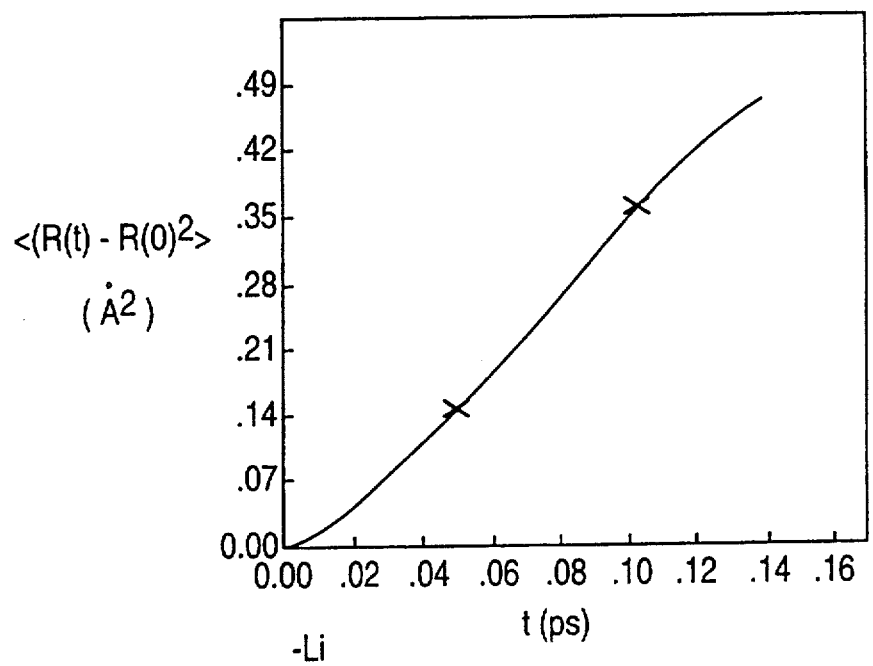
FIG. 10A shows a first example of a display screen.

When the file containing the calculation result obtained by using a time correlation function or a mean square displacement is selected, and when the display button (not shown in figures) is clicked, the graph for the file selected in S53 is displayed as shown in FIG. 10A, for example. The graph drawn according to a mean square displacement is displayed in this example, where R(t) indicates the coordinates of an atom at the time t, and is a kind of dynamics volume W(t).

If a transport coefficient is obtained through the graph drawn according to a mean square displacement shown in FIG. 10A, two points on the linear portion in the graph are inputted through a mouse, etc. after clicking the coefficient button (not shown in figures) in S55. The positions of the two points are indicated by x as shown in FIG. 10A. If a transport coefficient is obtained by the graph drawn according to a time correlation function, one point in the graph is inputted to designate the integral range after the click of the coefficient button (not shown in figures).

Figure 10B:
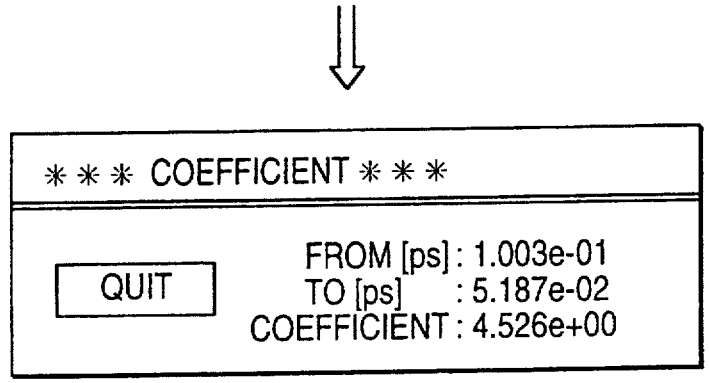
FIG. 10B shows a second example of a display screen.

The value of a transport coefficient is calculated for the calculation range inputted in S56, and the result is displayed as shown in FIG. 10B.

When the gradient of a graph is calculated, the following method of least square obtains a transport coefficient with excellent precision. Between two points hit on the graph, the following equation exists.

$$G(t) = at + b$$

where the function G(t) indicates a linear function of t, and a and b are constants. The time between the two points varies sequentially from $t_1, t_2, t_i, \ldots,$ and $t_n$.

In the method of least square, the values a and b are calculated such that they can generate the minimum value of the equation $D = \Sigma \| W(t_i) - G(t_i) \|^2$ (where $\Sigma$ indicates a sum with $i-1$ through N).

$$D = \Sigma \| W(t_i) - G(t_i) \|^2 = \Sigma \| W(t_i) - (at_i + b) \|^2 =$$
$$(\Sigma t_i^2)a^2 + 2(\Sigma t_i)ab + (\Sigma I)b^2 - 2(\Sigma t_i W(t_i))a -$$
$$2(\Sigma W(t_i))b + \Sigma W(t_i)^2$$

To obtain the values of a and b which minimize the value of D, the following simultaneous equations should be solved.

$$\partial D/\partial a = 0, \; \partial D/\partial b = 0$$

That is, the following equations should be solved to obtain the values of a and b, where a indicates the target gradient.

$$\partial D/\partial a = 2(\Sigma t_i^2)a + 2(\Sigma t_i)b - 2(\Sigma t_i W(t_i)) = 0$$

$$\partial D/\partial b = 2(\Sigma t_i)a + 2(\Sigma 1)b - 2(\Sigma W(t_i))b = 0$$

Figure 11:
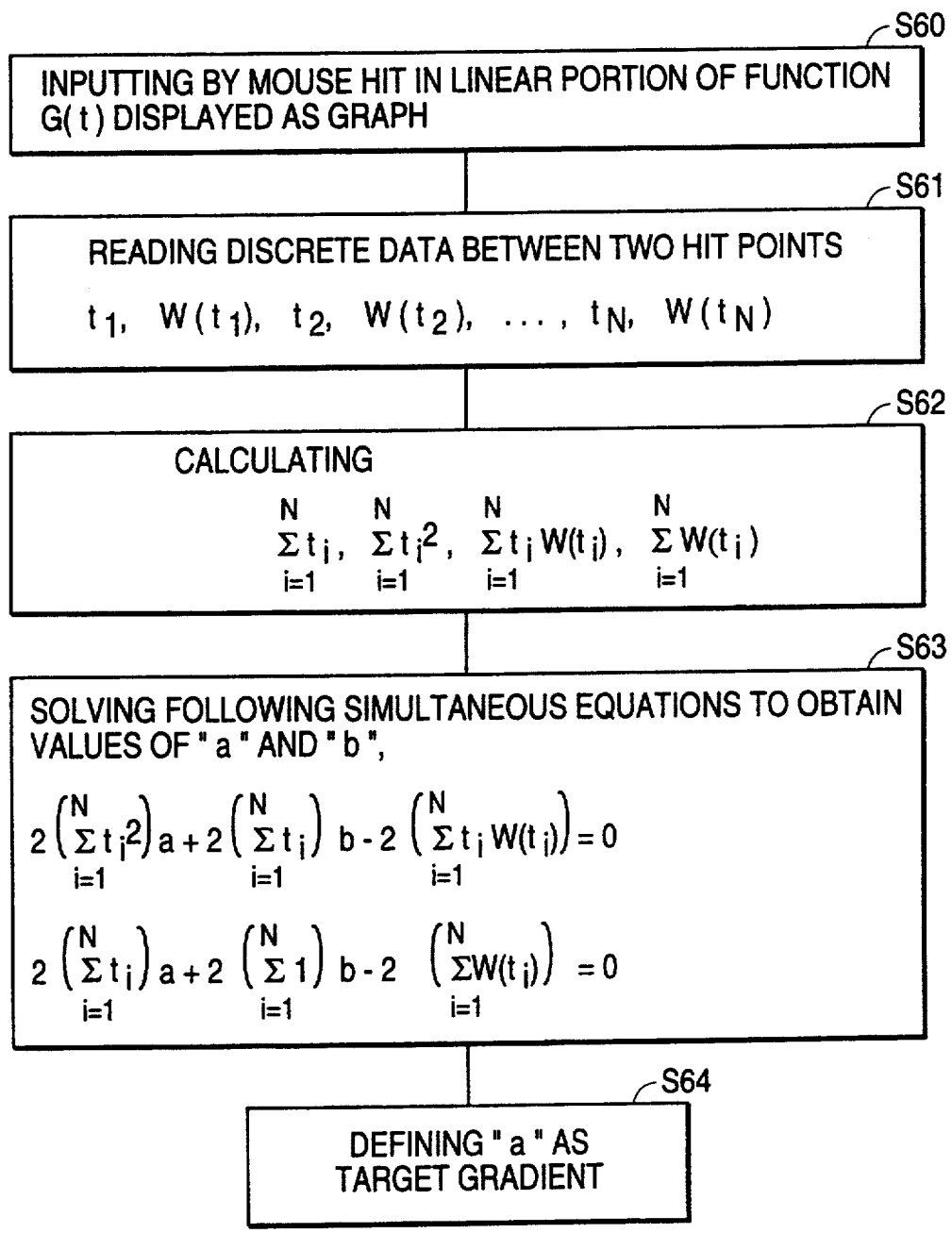
FIG. 11 is the flowchart for explaining the embodiment of the gradient calculation for a graph.

FIG. 11 is the flowchart of the above process.

First, in step S60, two points on the linear portion of the function G(t) shown as a graph are inputted by a mouse hit.

Then, the discrete data $t_1, W(t_1), t_2, W(t_2), \ldots, t_n, W(t_n)$ between the two points hit in S61 are read from the file.

According to the date, read in S62, the coefficients in the simultaneous equations $\Sigma t_i, \Sigma t_i^2, \Sigma t_i W(t_i), \Sigma W(t_i)$ are calculated, and the following simultaneous equations are solved in S63 and the values of a and b are obtained.

$$2(\Sigma t_i^2)a + 2(\Sigma t_i)b - 2(\Sigma t_i W(t_i)) = 0$$

$$2(\Sigma t_i)a + 2(\Sigma 1)b - 2(\Sigma W(t_i))b = 0$$

In S64, a is obtained as the target gradient.

As described above, the method of least square can be used to calculate the gradient of a graph.

According to the present invention, a calculation range can be specified by referring to the corresponding graph with excellent precision. Especially, the data outputted by the molecular dynamics simulator can be analyzed for reasonable portions, and transport coefficients can be easily calculated.

The present invention can be utilized for all industrial fields in which integral calculations and gradient calculations of a function are required, and in which a molecular dynamics simulator is used for developing and surveying various substances (materials).

What is claimed is:

1. An integral value calculating device for calculating an integral value of a function, comprising:
   a computer, comprising:
      graph display means for outputting a graph for a function according to received data;
      calculation range input means, communicating with said graph display means, for designating an integral range for said function according to position data externally designated for said graph; and
      integral value calculating means, communicating with said calculation range input means, for calculating the integral value of said function for said designated integral range; and
   an external unit connected to said computer and receiving the graph and the integral range.

2. The value calculating device according to claim 1, wherein
   said integral value calculating device external unit comprises display means for displaying the graph of said function according to the output of said graph display means, and said integral value calculating device comprises position input means for inputting to said calculation range input means the position data on the graph displayed on said display means, and comprises function data storage means for storing said function data and outputting said function data to said graph display means.

3. The integral value calculating device according to claim 1, wherein
   said external unit comprises display means;
   said calculation range input means designates an integral range for a function F(t) at time points corresponding to position data externally inputted for a graph of said function F(t); and
   said integral value calculating means calculates the integral value of said function F(t) for said designated integral range, and a result is output as a transport coefficient when said graph display means outputs a graph for the function F(t) indicating a time correlation function $<(W'(t)W'0))>$, where $< >$ indicates a sample average, in a format applicable to said display means where W'(t) indicates a time differentiation of a dynamic volume W(t) obtained according to data calculated based on a molecular dynamics method.

4. The integral value calculating device according to claim 3, wherein the time corresponding to said externally inputted position data indicates a time when an amplitude of said function F(t) has sufficiently converged.

5. A transport coefficient calculating method of a computer for obtaining a transport coefficient using the output of a molecular dynamics simulator, comprising the steps of:

selecting a file of the computer containing the data outputted by said molecular dynamics simulator;

selecting a transport coefficient analyzing method of the computer according to a time correlation function $F(t)$, a dynamics volume $W(t)$, and a time differentiation $W'(t)$;

inputting into the computer as calculation conditions a number of time series, a length of time series, a starting step, a step interval, and a number of steps indicating a time delay of adjacent time series;

calculating, by the computer, the value of the time correlation function $F(t)$;

displaying, by the computer, the graph of the time correlation function $F(t)$;

inputting into the computer, position data as a calculation range for a graph of the time correlation function $F(t)$; and calculating, by the computer, a value of the transport coefficient according to the integral calculation for the time correlation function $F(t)$ at the time corresponding to the inputted position.

6. A function gradient calculating device calculating the gradient of a function graph, comprising:

a computer, comprising:

graph display means for outputting a graph for a function according to received data in a first format;

calculation range input means for designating two points on the graph in which a gradient is to be calculated according to two position data externally designated and inputted for said graph; and function gradient calculating means for calculating the gradient of the graph between said two designated points; and an external unit coupled to said computer and receiving the graph in the first format and the gradient.

7. The function gradient calculating device according to claim 6, wherein said function gradient calculating means further comprises transport coefficient calculating means;

said external unit comprises a graph display unit which outputs in a format applicable to said display unit a graph $G(t)$, where a mean square displacement of a dynamics volume $W(t)$ obtained according to data calculated based on a molecular dynamics method $<(W(t)-W(0))^2>$ function gradient calculation range for the graph of $G(t)$ at two time points corresponding to said two position data externally inputted for said graph $G(t)$; and said function gradient calculating means calculates a gradient $((Gt_1)-G(t_2))/(t_1-t_2)$ of the graph for the function $G(t)$ between said two time points designated as a calculation range, and the calculation result is outputted as a transport coefficient of the dynamics volume $W(t)$.

8. The function gradient calculating device according to claim 7, wherein said two time points corresponding to said position data externally designated and inputted indicate approximately a constant gradient for said function $G(t)$ to each other.

9. The function gradient calculating device according to claim 7, wherein said calculating means calculates the gradient of the graph for said function $G(t)$ between said two designated time points according to a method of least square.

10. A number-of-transport-coefficient calculating method of a computer used for a transport coefficient calculation for obtaining a transport coefficient using the output of a molecular dynamics simulator, comprising the steps of:

selecting a file of the computer containing the data output by said molecular dynamics simulator;

selecting a transport coefficient analyzing method of the computer according to a mean square displacement $G(t)$ of a dynamics volume $W(t)$;

inputting into the computer as calculation conditions a number of time series, a length of time series, a starting step, a step interval, and a number of steps indicating a time delay of adjacent time series;

calculating, by the computer, the value of a mean square displacement $G(t)$;

displaying, by the computer, a graph of the mean square displacement $G(t)$;

inputting into the computer two position data as a calculation range for a gradient of the graph of the mean square displacement $G(t)$; and calculating, by the computer, a value of a transport coefficient according to the calculation of the gradient of the graph $G(t)$ between the two time points corresponding to the inputted position.

* * * * *

UNITED STATES PATENT AND TRADEMARK OFFICE
CERTIFICATE OF CORRECTION

PATENT NO. : 5,365,473
DATED : November 15, 1994
INVENTOR(S) : Takefumi NAMIKI et al.

It is certified that error appears in the above-indentified patent and that said Letters Patent is hereby corrected as shown below:

Title page, item
[56] References cited, delete "4,535,416" and insert --4,535,016--.

Column 3, line 27, delete "," (second occurrence).

Column 4, line 19, after ":" insert --$K=Vk_BT(4\eta/3+\zeta)$--.

Signed and Sealed this

Fourteenth Day of March, 1995

Attest:

BRUCE LEHMAN

Attesting Officer     Commissioner of Patents and Trademarks